: 3,320,215
WATER-SOLUBLE NYLON-TYPE RESINS
John S. Conte, Ridley Park, and Robert W. Faessinger, Media, Pa., assignors to Scott Paper Company, Philadelphia, Pa., a corporation of Pennsylvania
No Drawing. Filed Oct. 24, 1963, Ser. No. 318,493
13 Claims. (Cl. 260—78)

This invention relates to water-soluble nylon-type resinous compositions and the method of preparing same; more particularly, this invention relates to resinous compositions which may be generally described as balanced polymeric reaction products of (a) amino-carboxylic acid and/or lactams, (b) dibasic acids, esters or anhydrides, or mixtures thereof, (c) polyalkylene polyamines, and (d) crosslinking agents.

Prior art processes for preparing water-soluble crosslinked polyamine, dibasic acid resins have been modified mostly by addition of chain-extending components such as glycols. While this addition has given an alternative resin, a glycol component having a plurality of the same reactive groups has not contributed the desired properties.

Other types of chain-extending amines having terminal amine moieties have been used, but again, these amines having a plurality of the same reactive groups at the terminal positions have failed to yield a resin with sufficiently balanced properties.

It has now been found that the introduction of carboxyl and amine groups through nylon-type precursors gives novel resins having superior properties in applications such as making wet-strength papers. In essence, the present product is a novel, nylon-type, water-soluble resin—a reaction product of a lactam with dibasic acids, polyalkylene polyamines and a crosslinking agent—which imparts superior properties to paper.

It is not known why a particular chain-extending component in a given resin system gives better properties; however, in the present case, the lactam or the amino-carboxylic acid seems to impart properties due to the proper balance of the amide group distribution. Upon proper crosslinking of the resin components, these properties are more pronounced, especially if characterized by the results obtained when the resin is cured to a water-insoluble state such as in paper wet-strength applications.

In the preparation of these products, an amino-carboxylic acid or lactam, the dibasic acid, ester or anhydride, and polyalkylene polyamine are reacted in mole ratios, respectively, from about 0.1:1.0:0.9 to about 2.0:1.0:1.3 or, in the preferred mode, in a ratio of from about 0.1:1.0:0.9 to about 1.0:1.0:1.3, in an aqueous solution to produce a high molecular weight condensation product having a viscosity which ranges from about A to X on the Gardner-Holdt scale at about 40.0% solids and at 25° C.

This high molecular weight polyaminopolyamide is reacted with about 0.5 to about 2.0 moles of a crosslinking agent per mole of reactive amine groups in the condensate until a 10% solution has a viscosity of A to T on the Gardner scale at 25° C. However, the preferred range for the crosslinking agent is from about 0.8 mole to about 1.5 mole per mole of reactive amine groups in the condensate.

The reaction is stopped by dilution and/or adjusting the pH to 4–5 with a suitable mineral acid such as hydrochloric acid, etc. In this method the preferred mode of stopping the reaction is by adjusting the pH when the condensate contains about 10% solids. A more complete description of the reaction is given below with particular reference to the examples.

Suitable amino-carboxylic acids, esters or lactams which may be employed are, in general, amino acids having from 2 to 18 carbon atoms or other aliphatic amino-carboxylic acid. The preferred amino acids are those having from 5 to 14 atoms separating the —NH$_2$ and —COOH groups. The corresponding preferred lactams are those having 3 to 14 carbon atoms between the two groups.

Other amine group- and carboxyl group-containing compounds are those having an aromatic ring in the molecule. Aromatic groups such as phenyl, naphthyl, etc., are suitable. The amino group may be directly substituted on the aromatic nucleus or it may be a terminal carbon atom of an alkyl group of 1 to 7 carbons substituted on the aromatic ring. Similarly, the carboxylic acid group may be directly substituted on the aromatic ring or on a terminal carbon atom of an alkyl group of 1 to 7 carbons substituted on the aromatic ring. Of course, water solubility of the final resin characterizes the useful amine and carboxyl group-containing compounds.

Suitable amino carboxylic acids representative of the above groups are 6-amino caproic acid, 10-aminodecanoic acid, 9-aminostearic acid, 12-aminostearic acid, 13-aminobehenic acid, 9-aminopalmitic acid, glycine, 13-aminostearic acid, p-(2-aminoethyl) benzoic acid, p-aminophenylacetic acid, p-aminobenzoic acid and the like. Lactams which are suitable are pyrrolidone, E-caprolactam, laurolactam and the like. Generically, the lactams may be represented by

wherein R' is of from 3 to 18 carbon atoms in the interposed chain. Suitable amino acids can be generically represented by the formula H$_2$N—R—COOH wherein R is a divalent radical selected from the group consisting of from 1 to 20 carbon atoms (2 to 20 carbon atoms for the unsaturated acids), alicyclic radicals and aromatic radicals. Amino acids containing side chains are also included. Blends of these amino acids or lactams may also be employed. Preferred amino acids and lactams besides those mentioned above are those wherein R and R' are saturated carbon chains of from 5 to 14 and 3 to 14 carbon atoms, respectively. Caprolactam represents the preferred species.

The dicarboxylic acids which are suitable for the practice of this invention are those saturated aliphatic dicarboxylic acids containing 3 to 14 carbon atoms as well as alicyclic, aromatic and ethenoid dicarboxylic acids, their esters and anhydrides. Carboxylic acids in this group may be represented by the formula HOOC—R''—COOH, where R'' is a divalent radical selected from the group consisting of saturated 1 to 20 carbon atom radicals, unsaturated 2 to 20 carbon atom radicals, alicyclic radicals, aromatic radicals and esters and anhydrides of these acids. Dicarboxylic acids of this type, their esters and anhydrides are, for example, adipic acid, dimethyl adipate, succinic acid, succinic anhydride, glutaric anhydride, azelaic acid, sebacic acid, suberic acid, isosebacic acid; and other aliphatic acids such as diglycolic acid, and $\gamma,\gamma^1$ oxidibutyric acid; the aromatic dicarboxylic acids, e.g., phthalic acid, phthalic anhydride, isophthalic acid, terephthalic acid, dibenzoic acid; alicyclic compounds such as cyclopentane-1,3-dicarboxylic acid, cyclohexane-1,3-dicarboxylic acid, cyclohexane-1,4-dicarboxylic acid and the like. Other dicarboxylic acids, esters, or anhydrides which may be used are the C$_2$ to C$_{10}$ ethenoic acid such as fumaric acid, maleic acid, maleic anhydride, itaconic, citraconic, and mesaconic acids, etc. Blends of two or more of these dicarboxylic acids, esters or anhydrides may also be used as long as the resulting high molecular weight polyaminopolyamide is water soluble. Preferred acids are the saturated and unsaturated straight 4 to 20 carbon atom acids.

Of these the preferred are the saturated 4 to 20 carbon atom acids. Adipic acid represents the preferred species.

The polyalkylene polyamines suitable for this invention are polyamines represented by the general formula $$NH_2(R'''NH)_nH$$

where $R'''$ is an alkylene group of 2 to 8 carbon atoms, but preferably up to four with two and three carbon atoms representing the most preferred group, and where $n$ is an integer from 1 to 5, preferably 2 to 5, provided, however, that at least a significant portion (about 50% to about 60%) of the species should be where $n$ is greater than one. Polyalkylenepolyamines are such as diethylene triamine, triethylene tetramine, tetraethylene pentamine, bishexamethylene diamine, dipropylene triamine, and the like. Blends of two or more of these polyalkylenepolyamines may also be used, of which the polyethylenepolyamines are preferred.

As crosslinking agents, epichlorohydrin or 1,3 dichloropropanol are the preferred compounds. In addition, other crosslinking agents which may be used are those known to react with amines such as halohydrins, dichloroethylene, dichlorobutene, divinylsulfone, methylene bisacrylamide, diallylamine, glyoxal, crotonaldehyde, divinylether, glycidylaldehyde, diglycidylether and the like.

The preparation of the novel resinous composition of this invention is carried out in two steps. The first stage reaction, which is between the amino carboxylic acid or lactam, dicarboxylic acid, and polyalkylene polyamine, is carried out at a temperature ranging from 140° C. to 230° C. at reduced or atmospheric pressure. This reaction is continued within this temperature range until the viscosity of the condensation product falls within the aforementioned A–X Gardner range at 25° C. Generally, the above reaction is carried out at conditions causing the ring opening of the lactam used.

The second step reaction between the polyaminopolyamide formed above and the crosslinking agent, preferably epichlorohydrin or 1,3-dichloropropanol, is carried out in a temperature range of from about 25° C. to about 90° C. until the resulting resinous solution has a viscosity of about A to $Z^6$ on the Gardner-Holdt scale at 10% to 60% solids at 25° C. At this point, the reaction is stopped by dilution and/or adjusting the pH to 4–5.

A number of representative examples are included to illustrate the invention. Although these examples describe in detail some of the more particular aspects of the invention, the examples are intended primarily for purposes of illustrating the invention and not to limit its scope.

*Example 1*

Ninety-three grams (0.9 mole) of diethylene triamine, 20.0 grams (0.136 mole) of triethylene tetramine and 50 grams of water were placed in a vessel equipped with a mechanical agitator and condenser. To this solution were added 20.0 grams (0.177 mole) of E-caprolactam and 145 grams (1.0 mole) of adipic acid. After the E-caprolactam and the adipic acid had dissolved in the amine solution, the resulting mixture was heated until the theoretical amount of water was removed. Then, the mixture was heated in the range of 195–210° C. for 3½ hours, after which a vaccum from a water pump was applied to the flask for about 0.5 hour at 180–190° C. to ensure complete reactivity. The product so made was cooled to about 140° C. and dissolved in 385 grams of water. The viscosity, as measured at 25° C., of a solution with about 39.6% solid content was F on the Gardner scale.

To 91 grams of the above solution were added 263 grams of water. This solution then was heated to 50° C. at which time 16.0 grams of epichlorohydrin were added dropwise. The resulting mixture now was heated at 65° C. until a Gardner viscosity of J had been attained; then, 150 grams of water were added all at once and the product cooled to room temperature. This product, containing 9.4% solids, was adjusted to a pH of 4.0 and had a Gardner viscosity between G and H.

*Example 2*

A polyaminopolyamide was prepared from 93.0 grams (0.9 mole) of diethylene triamine, 20.0 grams (0.136 mole) of triethylene tetramine, 53.0 grams (0.48 mole) of E-caprolactam and 145.0 grams (1.0 mole) of adipic acid according to the procedure described in Example 1. The resultant polyaminopolyamide solution contained 39.7% solids and had a Gardner viscosity of I.

To 100 grams of the above polymer were added to 260.0 grams of water and the solution was heated to 50° C.; then, 23.0 grams of epichlorohydrin were added dropwise. This mixture was heated at 65–70° C. until a Gardner viscosity of about F had been attained. Then, 150 grams of water were added and the diluted solution cooled to room temperature. This product, containing 9.82% solids, was adjusted to a pH of 4.0 and had a Gardner viscosity between C and D.

*Example 3*

A polyaminopolyamide was prepared from 170 grams (1.060 moles) of an amine mixture which was 67% tetraethylene pentamine and 33% diethylene triamine, 113 grams (1.0 mole) of E-caprolactam and 145.0 grams (1.0 mole) of adipic acid according to the procedure described in Example 1 with the exception that the condensation was conducted at 195–210° C. for 6½ hours. The solution contained 43.9% solids and had a viscosity of M.

To 73.0 grams of this polyaminopolyamide were added 57.0 grams of water. This solution was heated to 50° C. and 20.0 grams of epichlorohydrin were added dropwise. Heating was continued at 70–75° C. After fifteen minutes, 50.0 grams of water were added and heating was continued at 65–70° C. until a viscosity of J was reached. Again 50 grams of water were added and the solution was heated at 65–70° C. until a viscosity of J was reached and 100 grams of water were added. Heating was continued until a viscosity of J was attained and 200 grams of water were added and the product was adjusted to a pH of 4.0. This product contained 8.6% solids and had a Gardner viscosity of F.

*Example 4*

A polyaminopolyamide was prepared, according to Example 1 from 113 grams (1.1 moles) of diethylene triamine, 29.5 grams (0.25 mole) of E-caprolactam and 145.0 grams (1.0 mole) of adipic acid having a viscosity measured at 25° C. of D on the Gardner scale, and a non-volatile solids content of about 39.3%.

To 87.5 grams of the above solution were added 200 grams of water. This solution was heated to 50° C. and 14 grams of epichlorohydrin were added dropwise. The resulting mixture was heated at 70–75° C. until a Gardner viscosity of I had been reached. Then, 160 grams of water were added and the product was cooled to room temperature. This product, containing about 10.2% solids, was adjusted to a pH of 4.0 and had a viscosity of about E.

*Example 5*

One hundred-seventy two grams (1.18 moles) of triethylene tetramine and 25 ml. of water were placed in a round bottom flask equipped with a mechanical agitator and condenser. To this solution were added 26.5 grams (0.235 mole) of E-caprolactam and 118.1 grams (1.0 mole) of succinic acid. This mixture was heated to 195–200° C. for four hours; then vacuum from a water pump was applied to the flask for ½ hour at 180–190° C. to ensure complete reactivity. The product was cooled to about 140° C. and dissolved in 430 grams of water. The viscosity, as measured at 25° C. in a solution containing about 40.4% solids was C on the Gardner scale.

To 87.5 grams of this polyaminopolyamide were added 12.5 grams of water. The solution was heated at 50° C. and 24.0 grams of epichlorohydrin were added dropwise.

The mixture was heated at 60–70° C. After fifteen minutes, 50 grams of water were added and the heating continued until a viscosity of L on the Gardner scale had been attained. Again, 50 grams of water were added. Heating continued until a viscosity of L was reached and 50 grams of water were again added. Again the heating continued at 60–70° C. until a viscosity of L was reached and 50 grams of water were added. The resin solution was heated an additional 0.5 hour and then diluted with 100 grams of water. The product was adjusted to a pH of 4.0 and 13.6% solution had a Gardner viscosity H to I.

*Example 6*

125 grams (1.07 moles) of an amine mixture which is 33% triethylene tetramine and 67% diethylene triamine were added to 29.5 grams (0.25 mole) of E-caprolactam, 109 grams (0.75 mole) of adipic acid and 29.5 grams (0.25 mole) of succinic acid. The mixture was heated at 190–200° C. for 4 hours; then vacuum from a water pump was applied to the flask for about ¼ hour at 180–190° C. The product was cooled to about 140° C. and 385 grams of water were added. The polyaminopolyamide solution contained 40.6% solids and had a Gardner viscosity of about E.

To 68.5 grams of this polyaminopolyamide were added 200 grams of water. The solution was heated to 50–60° C. and 16 grams of epichlorohydrin were added dropwise. The mixture was heated at about 80–85° C. until a Gardner viscosity of about F had been attained; then 160 grams of water were added and the resin solution adjusted to a pH of 4.0. This product, containing 9.3% solids, had a viscosity of C.

*Example 7*

A polyaminopolyamide was prepared according to Example 1 from 112 grams (1.09 moles) of diethylene triamine, 27.4 grams (0.25 mole) of p-aminobenzoic acid and 145.0 grams (1.0 mole) of adipic acid with the exception that the condensation was conducted at 190–205° C. for 4½ hours. The polyaminopolyamide solution contained 39.5% solids and had a viscosity of about C on the Gardner scale.

To 92.0 grams of this polyaminopolyamide were added 160.0 grams of water. The solution was heated to 70° C. and 14.0 grams of epichlorohydrin were added dropwise. The heating was continued at 70–75° C. until a Gardner viscosity of A was attained. Then, 100 ml. of water were added and heating was continued at 60° C. until a viscosity of G was reached. Finally, 150 ml. of water were added and the product was adjusted to a pH of 4.0 and contained 9.7% solids. It had a Gardner viscosity of E.

*Example 8*

A polyaminopolyamide was prepared according to Example 1 from 120 grams (1.03 moles) of an amine mixture which is 33% triethylene tetramine and 67% diethylene triamine, 22.0 grams (0.194 mole) E-caprolactam and 145 grams (1.0 mole) adipic acid with the exception that the condensation was conducted at 195–205° C. for 5¼ hours. The solution contained 40.2% solids and had a viscosity of H.

To 91.0 grams of the above solution were added 260.0 grams of water. This solution was heated to 50° C. and 17.5 grams of epichlorohydrin were added dropwise. The resulting mixture was heated to 65–70° C. until a viscosity of $Z^2$ on the Gardner scale had been reached. Then 350 grams of water were added. The product, containing 7.3% solids, was adjusted to a pH of 4.0.

*Example 9*

To 91.0 grams of a polyaminopolyamide prepared according to Example 1 were added 67.0 grams of water and 20.0 grams of 1,3 dichloropropanol. The mixture was heated at 50–60° C. until a viscosity of $Z^6$ was reached; then 236 grams of water were added. The product, containing 13.8% solids, was adjusted to a pH of 4.0.

The resinous compositions prepared as herein described are water soluble and may be used to improve the properties of paper, textile, etc.

What we claim is:

1. The method of preparing a water-soluble nylon-type resinous composition which comprises reacting:
   (a) a compound selected from at least one member of the group consisting of amino-carboxylic acids of the formula

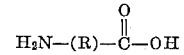

and lactams of the formula

wherein R is an aromatic group or an aliphatic hydrocarbon chain of from 1 to 18 carbon atoms and R' is an aliphatic hydrocarbon chain of from 3 to 18 carbon atoms in the interposed chain;
   (b) a compound selected from at least one member of the group consisting of a dicarboxylic acid of the formula

HOOC—R″—COOH wherein R″ is a divalent hydrocarbon radical selected from the group consisting of saturated and unsaturated aliphatic hydrocarbon radicals up to 20 carbon atoms, alicyclic hydrocarbon radicals, aromatic hydrocarbon radicals, and the esters and anhydrides of these acids;
   (c) at least one polyalkylene polyamine compound of the formula

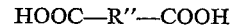

wherein R‴ is an alkylene group of from 2 to 8 carbon atoms and *n* is an integer of from 2 to 5, the above (a), (b) and (c) components on mole basis in the reaction mixture being from about 0.1:1.0:0.9 to about 2.0:1.0:1.3 respectively; thereafter further reacting the obtained condensation product with about 0.5 to about 2.0 moles of epichlorohydrin or 1,3-dichloropropanol per mole of reactive amine groups.

2. The method of preparing a water-soluble nylon-type resinous composition which comprises reacting:
   (a) at least one compound of the formula

wherein R' is an aliphatic hydrocarbon chain containing from 3 to 18 carbon atoms;
   (b) a compound of the formula

HOOC—R″—COOH wherein R″ is a divalent hydrocarbon radical of from 2 to 20 carbon atoms;
   (c) at least one polyalkylene polyamine compound of the formula

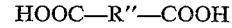

wherein R‴ is an alkylene group of from 2 to 8 carbon atoms and *n* is an integer of from 2 to 5; the above (a), (b), and (c) components on mole basis in the reaction mixture being of from about 0.1:1.0:0.9 to about 1.0:1.0:1.3, respectively, the reaction being carried out at a temperature of from about 140° C. to about 230° C. for a time sufficient to achieve a viscosity of from about A to X on the Gardner-Holdt scale at about 40% aqueous solution at 25° C.; further reacting the obtained condensation product with about 0.8 to about 1.5 moles epichlorohydrin or 1,3-dichloropropanol at a temperature of from about 25° C. to about 90° C. until the resinous solution has a viscosity of about A to $Z^6$ on the Gardner-Holdt scale at about 10% to 60% aqueous solution at 25° C., and then stopping the reaction.

3. The method of preparing a water soluble nylon-type resinous composition which comprises reacting:
(a) a compound of the formula

wherein R′ is an alkalene containing from 3 to 18 carbon atoms;
(b) a compound of the formula

HOOC—R″—COOH wherein R″ is a divalent hydrocarbon radical containing from 2 to 20 atoms;
(c) at least one polyalkylene polyamine compound of the formula $H_2N$—(R‴NH)$_n$—H wherein R‴ is an alkylene group of from 2 to 8 carbon atoms and $n$ is an integer of from 2 to 5; the above (a), (b) and (c) components on mole basis in the reaction mixture being of from about 0.1:1.0:0.9 to about 1.0:1.0:1.3 respectively, the reaction being carried out at a temperature of from about 140° C. to about 230° C. for a time sufficient to achieve a viscosity of from about A to X on Gardner-Holdt scale at 25° C. and at a solid content of about 40%; further reacting the obtained condensation product with about 0.5 to about 2.0 moles of an epihalohydrin per mole of reactive amine groups at a temperature of from about 25° C. to about 90° C. until the resulting product has a viscosity of about A to about $Z^6$ on the Gardner-Holdt scale at 25° C., and a solid content of about 10% to about 60%, then stopping the reaction.

4. The process according to claim 1 wherein (a) is E-caprolactam; (b) is adipic acid; and (c) is a mixture of diethylene triamine and triethylene tetramine; and (d) is epichlorohydrin.

5. The process according to claim 1 wherein (a) is E-caprolactam; (b) is a mixture of adipic acid and succinic acid; (c) is a mixture of triethylene tetramine and diethylene triamine; and (d) is 1,3-dichloropropanol.

6. The method of preparing a water-soluble nylon-type resinous composition according to claim 1 wherein (a) is p-aminobenzoic acid; (b) is adipic acid; (c) is diethylene triamine; and the crosslinking agent is epichlorohydrin.

7. The method of preparing water-soluble nylon-type resinous compositions according to claim 1 wherein (a) is caprolactam.

8. The method of preparing water-soluble nylon-type resinous compositions according to claim 1 wherein (b) is adipic acid.

9. The method of preparing water-soluble nylon-type resinous compositions according to claim 1 wherein (b) is a mixture of adipic and succinic acids.

10. The method of preparing water-soluble nylon-type resinous compositions according to claim 1 wherein (a) is E-caprolactam and (b) is adipic acid.

11. The method of preparing water-soluble nylon-type resinous compositions according to claim 1 wherein (d) is 1,3-dichloropropanol.

12. The method of preparing water-soluble nylon-type resinous compositions according to claim 1 wherein (d) is epichlorohydrin.

13. The water-soluble nylon-type resinous compositions produced by the method of claim 1.

References Cited by the Examiner

UNITED STATES PATENTS

| | | | |
|---|---|---|---|
| 2,252,555 | 8/1941 | Carothers | 260—78 |
| 2,252,557 | 8/1941 | Czerwin | 260—78 |
| 2,688,011 | 8/1954 | Wheatley et al. | 260—78 |
| 2,893,980 | 7/1954 | Ham et al. | 260—78 |
| 2,926,145 | 2/1960 | Keim | 260—78 |
| 3,125,552 | 3/1964 | Loshaek et al. | 260—78 |
| 3,197,427 | 7/1965 | Schmalz | 260—78 |
| 3,240,761 | 3/1966 | Keim et al. | 260—78 |

WILLIAM H. SHORT, *Primary Examiner.*

H. D. ANDERSON, *Assistant Examiner.*